Jan. 5, 1960     H. N. RIDGWAY     2,919,932
AUTOMATIC SAFETY GUARD FOR VEHICLES
Filed Oct. 22, 1957     4 Sheets-Sheet 1
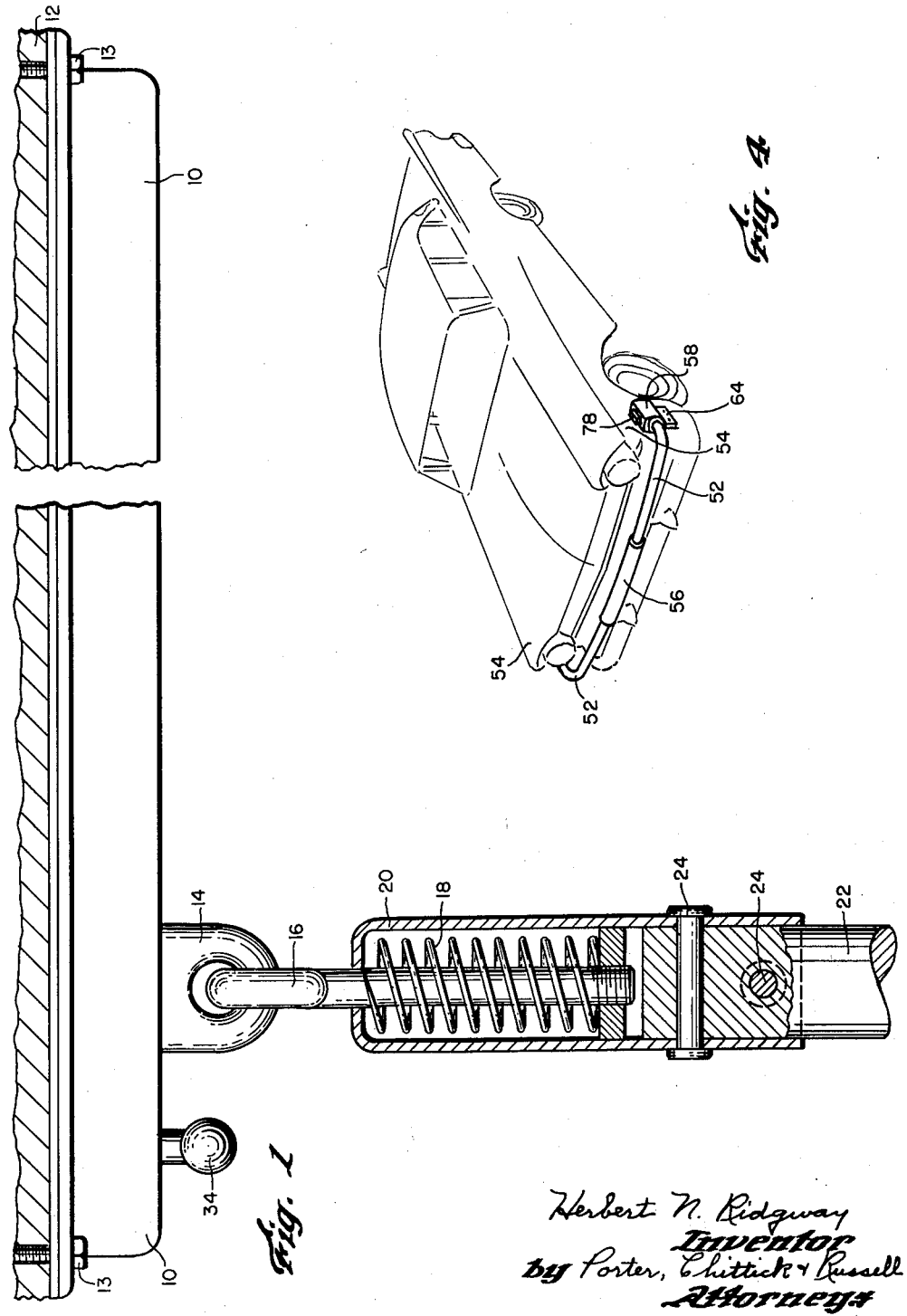
Herbert N. Ridgway
Inventor
by Porter, Chittick & Russell
Attorneys

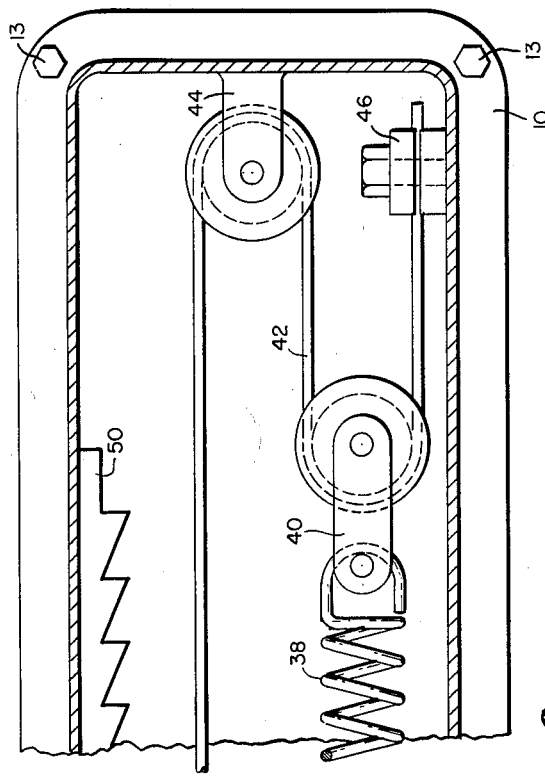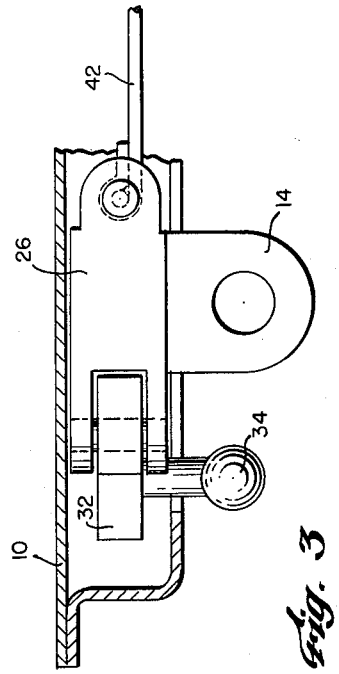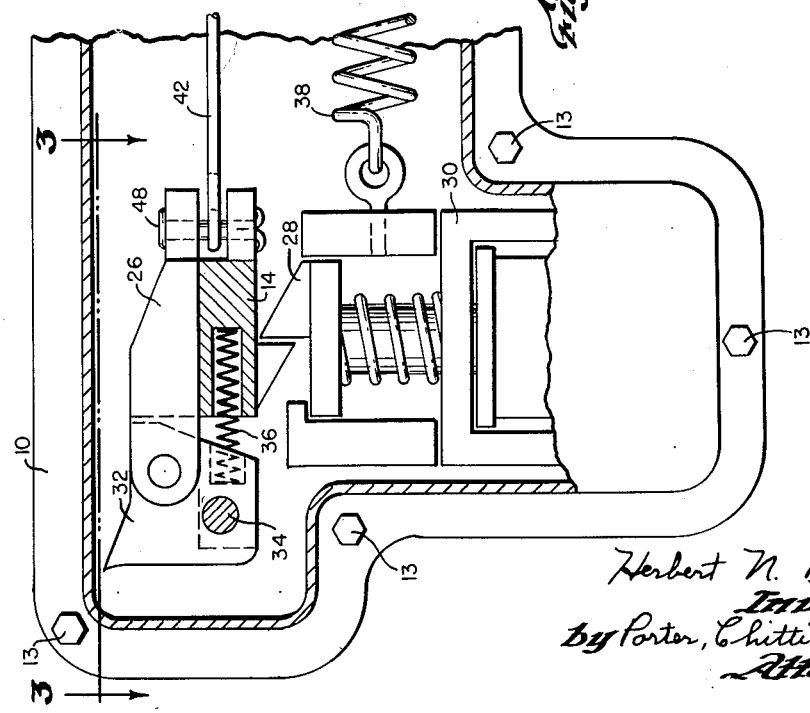

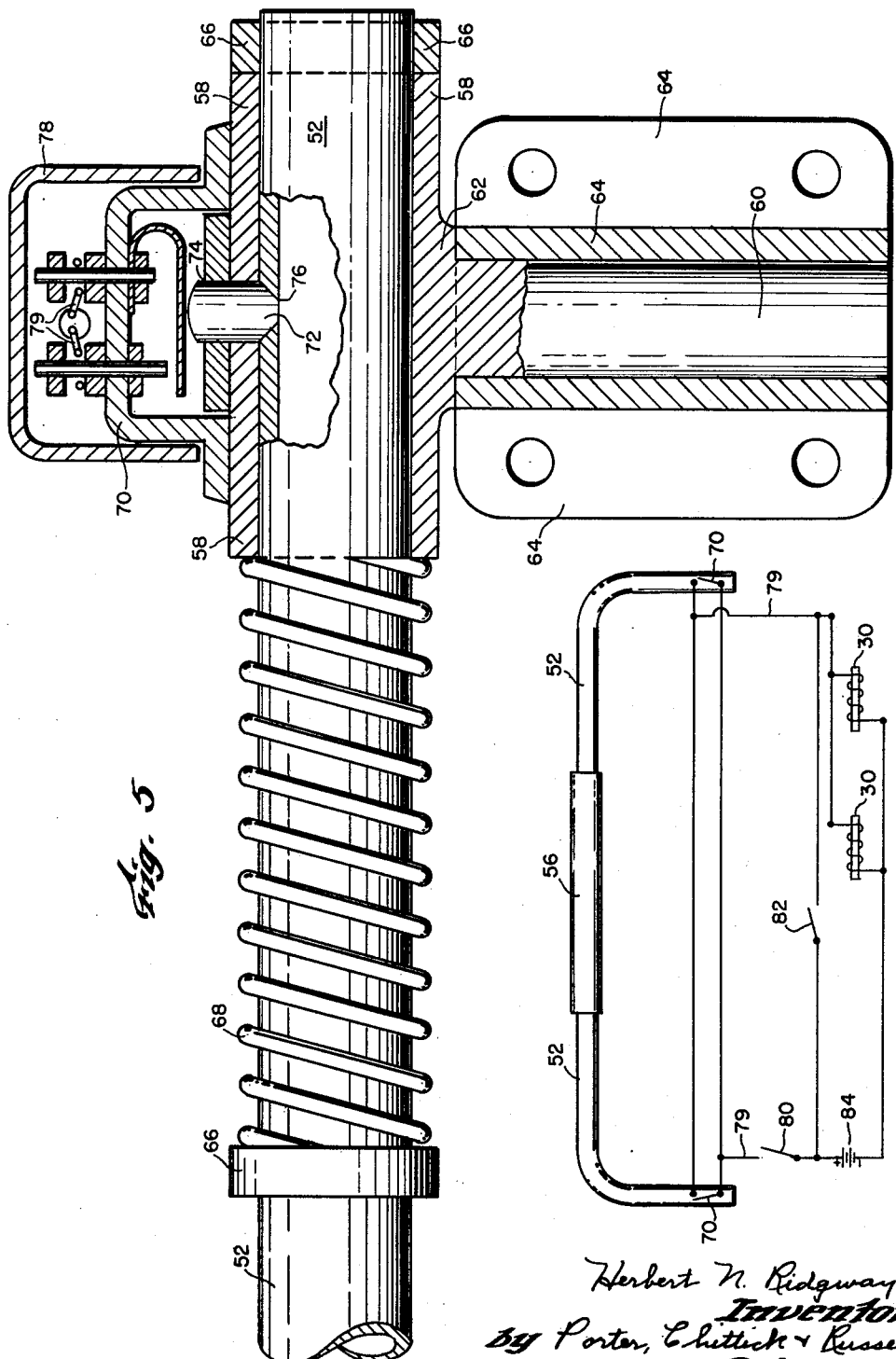

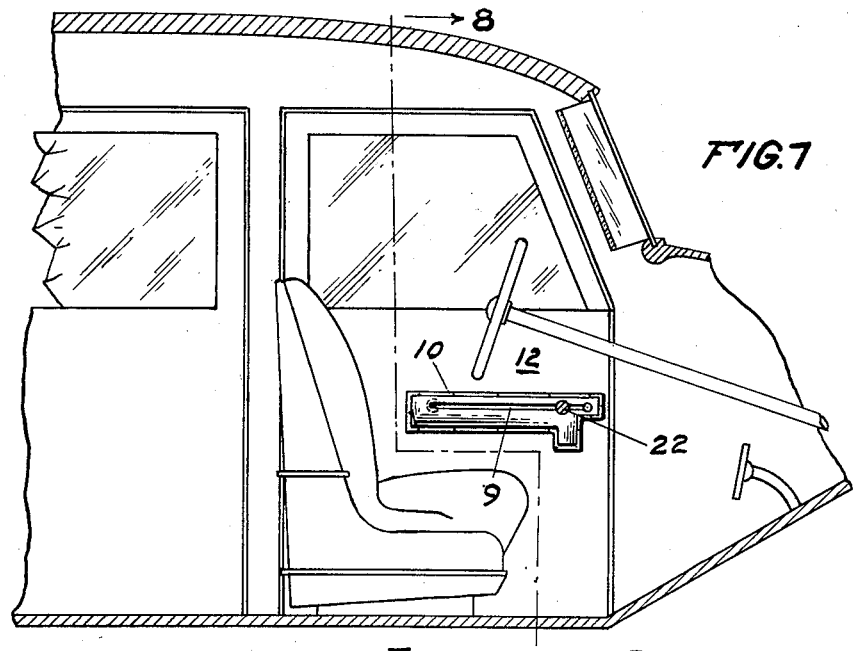
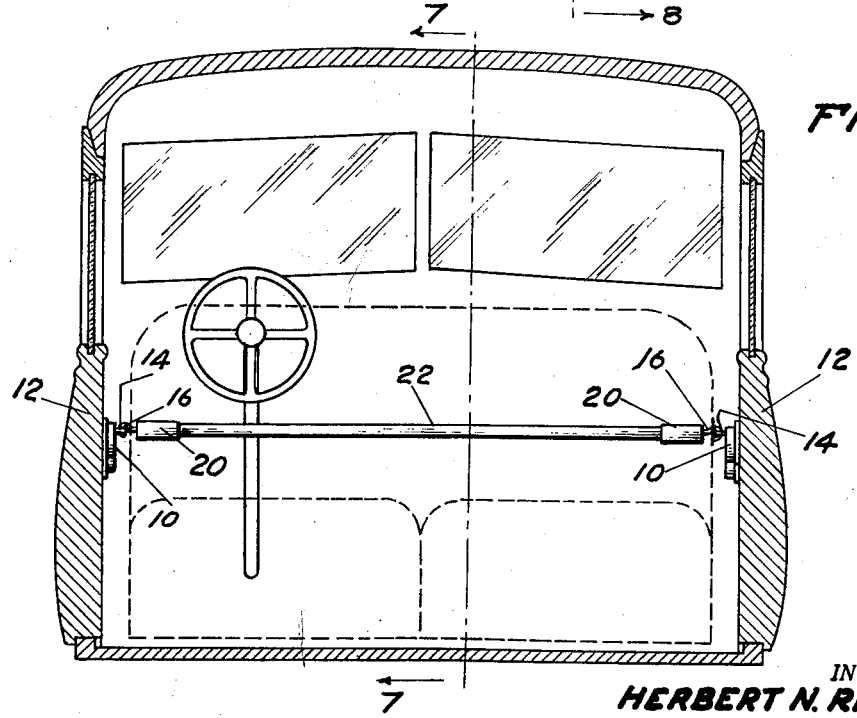

United States Patent Office 2,919,932
Patented Jan. 5, 1960

2,919,932

AUTOMATIC SAFETY GUARD FOR VEHICLES

Herbert N. Ridgway, Winthrop, Mass.

Application October 22, 1957, Serial No. 691,568

3 Claims. (Cl. 280—150)

This invention relates to an automatic safety guard member for use in rapidly moving vehicles, and more particularly to a guard member which comes into operation only in emergencies.

It is well known that the number of serious injuries due to automobile accidents could be substantially lessened by more frequent use of so-called safety guard members. The increase in speed and weight of modern autos plus the development of super highways encourages ever higher average speeds of moving traffic. This, in turn, must inevitably lead to an ever increasing number of fatal and near fatal accidents.

The unpopularity of the ordinary restraining safety belt is attributed, and correctly, to the inconvenience of fastening and unfastening the belt each time a passenger or driver enters or leaves the vehicle. For this reason most drivers have not fitted their cars with such safety belts, and even those who have done so are inclined soon to become bored with putting them on and taking them off. Moreover, those who do make the effort to use their safety belts complain of the restriction which the really effective belts necessarily make on normal body movement while the vehicle is underway.

Therefore, one object of my invention is to eliminate the inconvenience of fastening and unfastening a safety belt or guard member each time a person travels in an automobile. This will encourage use of safety guard means by those who have hitherto avoided installation of conventional devices due to their inconvenience. Another object is to locate the safety element out of the way of the passenger in its normal position thereby affording complete normal freedom of movement while underway. A further object is to provide a safety restraining device or guard member which will only come into operation when it is needed; that is, just as a collision occurs.

In the accomplishment of these and other objects of my invention in a preferred embodiment thereof, I employ at each side of the seat of the vehicle, a hollow horizontal traverse framework, slotted along its length, mounted along the inside of the vehicle doors.

Within each traverse framework is a travelling block and a powerful spring. Attached to these travelling blocks and stretching across the vehicle seat is a restraining guard member, which is normally locked in a forward position by a solenoid on each side of the frameworks. The traverse frameworks are positioned so that the forward ends hold the guard member out of the way when it is in its normal position, and the rear ends are opposite the approximate position of the waist of a person who would occupy the seat. When the guard member has been pulled to the rear, it is locked in that position by a ratchet mechanism, which adjusts automatically for persons who are stout or thin.

The solenoids at the front of each traverse framework are connected to four switches, one of which is on the dashboard or steering column, conveniently located near the driver. By closing this switch whenever he sees a dangerous situation approaching, the driver can release the guard member from its locked position, and allow the springs to pull it back and protect the passengers. The other two switches are located on a collision bumper, mounted above and ahead of the vehicle's ordinary bumper. This bumper is placed so that it will not be actuated by most of the normal bumps of traffic, but it will be pushed backwards in a collision. Two switches are located on the collision bumper, one at each end, so that any rearward movement by it will close either or both of the switches, which in turn will release the guard member. A fourth switch is inserted in series with the two collision bumper switches. Turning this switch off will prevent actuation of the guard member mechanism, and could be used while parking or in heavy, slow-moving traffic.

A feature of my invention is that use of the guard member involves no inconvenience to any passenger in the vehicle, since said guard member is out of the way when a passenger enters or leaves the vehicle, and nothing need be done by the passenger to make the guard member ready for use. Another feature is that the belt does not interfere with a passenger's movement during all normal driving, since it remains out of the way in its forward position. An additional feature is that a guard member can be installed in either the front or back seat of a vehicle and in any type of vehicle, whether it be sedan, truck, station wagon, etc., with the exception of a two-door sedan where it can only be installed for use in the front seat.

A further feature of my invention is that the seat guard member only restrains a passenger at times when it is needed, just before a collision occurs. The driver can actuate the guard member mechanism by throwing the switch on the dashboard, or the collision bumper will automatically actuate the belt mechanism. The springs which pull the guard member back on the traverse frameworks can be given additional speed through a cable and pully arrangement, so that the guard member firmly holds a passenger in his seat before momentum begins to carry him forward.

These and other objects and features of the invention will best be understood and appreciated from the following description of a preferred embodiment thereof, selected for purposes of illustration and shown in the accompanying drawings in which:

Fig. 1 is a plan view, partially broken away for purposes of clarity, of a traverse framework attached to an automobile door, with a perforated lug extending out from the traverse framework, and a guard member with its hook attached to the perforated lug;

Fig. 2 is a view in side elevation, partially broken away for purposes of clarity, of a traverse framework and the mechanisms within it;

Fig. 3 is a cross-sectional plan view along the lines 3—3 of Fig. 2 showing the travelling block with its perforated lug, pawl and stud within the traverse framework;

Fig. 4 is a view in perspective of a collision bumper mounted on the front of an automobile;

Fig. 5 is a view in side elevation, partially broken away for purposes of clarity, of a collision bumper and switch; and Fig. 6 is a wiring diagram illustrating the electrical connections employed in my invention.

Fig. 7 is a vertical section through an automobile body equipped with my safety device and taken on the line 7—7 Fig. 8.

Fig. 8 is a section taken on the line 8—8 Fig. 7.

In the preferred embodiment of my invention, elongated hollow traverse frameworks 10 are attached to opposite automobile doors 12 with bolts 13 each framework having a slot 9 extending the length thereof. A perforated lug 14 projects out through the slot of each traverse framework 10, and these lugs 14 hold hooks 16. The hooks 16 are connected to springs 18, which fit inside caps 20, and the caps 20 are attached to each end of a guard member 22 by rivets 24.

Inside each traverse framework 10, as shown in Fig. 2, a travelling block 26 is held in place by the armature 28 of a solenoid 30. Attached to the travelling block 26 is the perforated lug 14, a pawl 32, and a stud 34. A small compression spring 36 spring loads the pawl 32. A powerful tension spring 38 is fastened at one end to the body of the solenoid 30 and at the other end to a pulley 40. A cable 42 runs through the pulley 40, through another pulley 44, and is connected by a bolt 46 to the traverse framework 10 and by a pin 48 to the travelling block 26. A rack of teeth 50 is mounted on the inside top rear of each traverse framework 10 in a position to engage the pawl 32, when the pawl 32 has been drawn to the rear.

A collision bumper 52 is shown mounted on the front fenders 54 of an automobile in Figs. 4 and 5. The bumper 52 is split in the middle and the two halves are held together by tubing 56 which fits over the bumper 52. At its ends, the bumper 52 fits into metal sleeves 58, one of which is on each side of the automobile. The metal sleeves 58 and the arms 60 projecting therefrom form the cross members and vertical members respectfully of T-shaped elements 62 which fit into plates 64. The plates 64 are bolted to the auto fenders 54. Rings 66 are fixed to the bumper 52 to prevent it from slipping out of the sleeves 58. Compression springs 68 hold the bumper 52 extended in front of the automobile. An electrical switch 70 is mounted on top of each sleeve 58, and push-buttons 72 project downwards from the switches 70 through holes 74 in the sleeves 58 into tapered holes 76 in the bumper 52. Caps 78 fit over the switches 70 and protect them. Wires 79 connect the switches 70 with the solenoids 30.

Other electrical switches illustrated in Fig. 6 are a switch 80, in series connection with the switches 70 on the collision bumper 52, and a switch 82 in parallel connection with the switches 70. These switches 80 and 82, located on the dashboard or steering column of an automobile, permit the driver either to prevent the collision bumper 52 from actuating the solenoids 30 or to actuate the solenoids 30 immediately, without waiting for the operation of the collision bumper 52. A battery 84 represents the connection of this circuit to the automobile electrical system.

It will now be seen that the operation of my invention is as follows. Whenever a collision occurs, the collision bumper is moved backwards within the sleeves 58, against the force of the springs 68. If the main force of the collision is from the side, the tubing 56 will allow the halves of the bumper 52 to separate, and one half may be pushed into its sleeve 58 while the other is not. The T-shaped elements 62 are rotatable on a vertical axis within the plates 64, and this feature compensates for any changes in the over-all length of the bumper 52, after the two halves separate.

Backward movement of the bumper 52 causes either or both of the pushbuttons 72 to be forced upwards out of their holes 76 in the bumper 52. This closes one or both of the switches 70 and, unless the switch 80 is open, actuates the solenoids 30. Alternatively, a passenger in the automobile may close the other dashboard switch 82 and thus actuate the solenoids 30. An electrical current through the solenoids 30 pulls the armatures 28 down and releases the travelling blocks 26. The tension springs 38 pull the pulleys 40 forward, and by means of the cables 42 and other pulleys 44, the travelling blocks 26 and the guard member 22 are pulled to the rear. The speed of movement of the spring 38 is doubled by the pulley and cable arrangement, and insures that the guard member 22 will be pulled back in time to restrain the passengers in their seats when a collision occurs.

Each pawl 32 engages one of the teeth in the racks 50 when the travelling blocks 26 and guard member 22 are pulled back into operative position. This locks the guard member in its operative position, and prevents the momentum of the passengers from pulling said guard member 22 forward. When it is desired to release the guard member 22, downward pressure on the studs 34 will release the pawls 32 from the racks 50, and the guard member 22 can be pushed forward and locked in its forward position.

The springs 18, inside the caps 20 which cover each end of the guard member 22, allow a certain amount of elasticity therein. This allows the automobile doors to be opened more easily, although the forward position of the guard member 22 is located so that there is little movement of that portion of the traverse frameworks 10 when the doors are opened.

Certain minor variations of the preferred embodiment will be apparent to those skilled in the art, and therefore, it is not my intention to confine the invention to the precise form herein shown, but rather to limit it in terms of the appended claims.

Having thus described and disclosed a preferred embodiment of my invention, what I claim as new and desire to secure by Letters Patent of the United States is:

1. In combination with a vehicle having a seat, an automatic momentum restraining device, said device comprising a pair of straight hollow traverse frameworks, means mounting said frameworks in horizontal positions, one at each side of said seat, a traveling block located entirely within each framework and movable lengthwise thereof, a guard member extending from one framework to the other and secured at its ends to the traveling blocks within the frameworks, spring means within each framework and acting on the corresponding traveling block, said springs continually applying a force to the traveling blocks tending to move them and the guard member from an inoperative front position to an operative rear position, electrically controlled locking means at the front end of each framework normally locking the traveling blocks and the guard member in their inoperative positions, means to release the locking means thereby allowing said springs to automatically move the traveling blocks and the guard member into their operative positions, hand-controlled locking means separate from the electrically controlled locking means and located within each framework at its rear end to lock the corresponding traveling block in its rearward operative position into which it has been moved by said springs.

2. The combination with a vehicle having a seat and a door at each end thereof, of an automatic momentum restraining device, said device comprising a pair of hollow traverse frameworks, means mounting a framework in horizontal position on the inside of each door, each framework having a slot extending lengthwise thereof on its inner side, a traveling block within each framework and capable of movement therein longitudinally thereof, a lug carried by each traveling block and projecting through the slot in the corresponding framework, a guard member extending from one framework to the other and connected to both lugs, locking means within each framework at the front end thereof and normally locking the corresponding traveling block at said front end whereby the guard member is normally held in its inoperative forward position, spring means located within each framework and acting against the traveling block therein tending to move it from its forward inoperative position backwardly toward the rear end of the framework, means to release the locking means whereby said springs act automatically to move the traveling blocks and the guard member from their forward inoperative position to their rearward operative position, and means other than the aforementioned locking means and located within the framework at the rear end thereof for automatically locking the traveling blocks in such rearward operative position.

3. The combination with a vehicle having a seat and a pivoted door at each end of the seat, of an automatic momentum restraining device comprising a pair of elongated hollow traverse frameworks, means mounting a framework in horizontal position on the inside of each door, each framework having a slot extending lengthwise thereof on its inner side, a traveling block enclosed within each framework and capable of movement therein lengthwise thereof, a lug rigid with each traveling block and projecting through the slot of the corresponding framework, a guard member extending from one framework to the other and yieldingly connected to each of said perforated lugs, locking means which is operative independently of the opening and closing movement of the doors and which normally locks the traveling blocks and the guard member at the front ends of the frameworks, said locking means including a locking lug on each traveling block and a solenoid enclosed within the corresponding framework at the front end thereof and having an armature which is in locking engagement with said lug when the solenoid is deenergized, means independent of the opening and closing movement of the doors to energize the solenoids thereby releasing the traveling blocks, spring means enclosed in each traverse framework and acting on the corresponding traveling block to move it and the guard member automatically into an operative rearward position in which said guard member prevents an occupant of the seat from being thrown forwardly due to a sudden stoppage of the vehicle, and a second locking means located at the rear of each framework and which automatically locks the corresponding traveling block from forward movement.

References Cited in the file of this patent
UNITED STATES PATENTS

| | | |
|---|---|---|
| 2,586,063 | Kurtz | Feb. 19, 1952 |
| 2,592,573 | Joncas | Apr. 15, 1952 |
| 2,801,866 | Naslund | Aug. 6, 1957 |
| 2,858,144 | Oppenheim | Oct. 28, 1958 |